(12) United States Patent
Kalkbrenner et al.

(10) Patent No.: US 11,314,068 B2
(45) Date of Patent: Apr. 26, 2022

(54) ILLUMINATION APPARATUS FOR A MICROSCOPE, METHOD FOR OPERATING IT, AND MICROSCOPE HAVING AN ILLUMINATION APPARATUS

(71) Applicant: Carl Zeiss Microscopy GmbH, Jena (DE)

(72) Inventors: Thomas Kalkbrenner, Jena (DE); Jakob Haarstrich, Jena (DE); Jörg Siebenmorgen, Jena (DE); Andreas Möbius, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 439 days.

(21) Appl. No.: 16/574,437

(22) Filed: Sep. 18, 2019

(65) Prior Publication Data

US 2020/0096752 A1    Mar. 26, 2020

(30) Foreign Application Priority Data

Sep. 20, 2018  (DE) .......................... 102018216039.2

(51) Int. Cl.
*G02B 21/00* (2006.01)
*G02F 1/13* (2006.01)
*G02B 21/08* (2006.01)

(52) U.S. Cl.
CPC ....... *G02B 21/0032* (2013.01); *G02F 1/1313* (2013.01); *G02B 21/0088* (2013.01); *G02B 21/082* (2013.01)

(58) Field of Classification Search
None
See application file for complete search history.

(56) References Cited

U.S. PATENT DOCUMENTS

| 3,920,311 A | 11/1975 | Tsuda et al. |
| 2014/0184776 A1* | 7/2014 | Pyo .......................... G01Q 60/22 348/79 |

(Continued)

FOREIGN PATENT DOCUMENTS

| DE | 2422417 A1 | 11/1974 |
| DE | 102005033927 A1 | 6/2007 |

OTHER PUBLICATIONS

German Search Report dated May 29, 2019.

(Continued)

*Primary Examiner* — Christopher Stanford
*Assistant Examiner* — Journey F Sumlar
(74) *Attorney, Agent, or Firm* — Duane Morris LLP

(57) ABSTRACT

The invention relates to an illumination apparatus for a microscope, a microscope and a method for operating the illumination apparatus. The illumination apparatus has a sample space for holding a sample that is to be illuminated, and at least one laser light source. An objective for the directional emission of laser radiation of a first wavelength along a first optical axis that is directed into the sample space, and with a cover of the sample space by which the sample space is delimited at least on one of its sides. The cover further has a layer that is either impenetrable for the laser radiation over a blocking angle range of the illumination angle and is transmissive for radiation of a second wavelength over a transmitted light angle range, or has a controllable layer that, in a first control state, is transparent for radiation of the second wavelength and, in a second control state, is impenetrable for the laser radiation of the first wavelength.

10 Claims, 10 Drawing Sheets

(56) References Cited

U.S. PATENT DOCUMENTS

2017/0139195 A1     5/2017  Kennedy
2017/0269345 A1*    9/2017  Siebenmorgen ... G02B 21/0032
2019/0265454 A1*    8/2019  Kalkbrenner ......... G02B 21/32

OTHER PUBLICATIONS

Huisken, Jan, et al.; "Optical Sectioning Deep Inside Live Embryos by Selective Plane Illumination Microscopy" Science 2004; 305:1007-1009 with Supporting Online Material pp. 1-15.
Leica Microsystems CMS GmbH; "Live on Stage—Live Cell Microscopy" 2018; 1-96.

* cited by examiner

ILLUMINATION APPARATUS FOR A MICROSCOPE, METHOD FOR OPERATING IT, AND MICROSCOPE HAVING AN ILLUMINATION APPARATUS

RELATED APPLICATIONS

The present application is a non-provisional application that claims priority to German Application No. DE 10 2018 216 039.2 filed on Sep. 20, 2018, the contents of which are hereby incorporated by reference in their entirety.

FIELD OF THE INVENTION

When working with laser radiation of all hazard classes, protective measures must be taken aimed at preventing uncontrolled irradiation of the environment. For example, regions where laser radiation is used for welding are encased.

BACKGROUND OF THE INVENTION

In the field of microscopy, laser radiation is used for example to illuminate samples and for the purpose of manipulating samples. Known examples of the use of laser radiation are activation and/or excitation of fluorescence markers and the targeted bleaching of selected areas of the sample.

When imaging using excited fluorescence in microscopy, both low signal levels of a detection radiation that is to be captured for imaging purposes and, for example in methods such as laser scanning microscopy or light sheet microscopy, lasers as illumination light sources must be used together.

In that case, the low signal levels require a significant suppression of ambient light that is the cause of undesirable background signals (noise) on the detectors used. At the same time, laser radiation must be prevented from exiting from a defined sample space and being able to cause harm to living beings and damage to objects by using active and/or passive laser security devices. Both measures frequently result in restrictions in utilizability of corresponding apparatuses, for example of high-resolution microscopes.

Measures for reducing disturbing ambient light known to date consist for example in measuring samples in a darkened space and/or providing the sample with a shield that prevents ambient light from coming into the sample space and laser radiation from exiting from the sample space.

In particular, such a shield or cover of the sample space prevents the use of transmitted light illumination. If incubation of the sample is additionally necessary, as is for example often the case in live-cell imaging, the entire sample space generally has to be temperature-controlled. Consequently, systems like these are often very large and their operation requires a lot of energy.

FIG. 1 schematically illustrates an inverse light sheet microscope as a representative for the abovementioned systems. The sample 3 is located in a sample space 2 and can be arranged there on a sample carrier or sample holder (for example Petri dish, multi-well plate, coverslip). The sample space 2 can be embodied in the form of an incubator or be part of an incubator in which temperature, humidity and/or a gas mixture can be set. The sample space 2 is arranged in a housing 1.1, which is a constituent part of a microscope 1, which is merely intimated in the illustration. A first objective 4 is directed by way of its optical axis which is designated the first optical axis A1 into the sample space 2 and onto the sample 3 that is located therein at an illumination angle α1.

The illumination angle α1, measured to a normal N of a reference plane REF, is greater than zero and smaller than 90°. The reference plane REF extends parallel to a side face 8.1, which faces the sample space 2, of a cover 8 by which the sample space 2 is closed on one of its sides, in the present case on the upwardly facing side. Laser radiation of a first wavelength λ1, which, using the first objective 4, is shaped into a light sheet 15 and directed into the sample space 2, is provided using a laser light source 7. A second objective 5 is likewise directed into the sample space 2 by way of its optical axis which is designated the second optical axis A2, wherein the two optical axes A1, A2 together enclose an angle of approximately 90° (illumination angle α1+detection angle α2=90°). Detection radiation collected using the second objective 5 is guided onto a detector, not illustrated in the annexed drawings, and captured thereby. An optical element 6, which serves for correcting any aberrations that are caused in particular by the oblique passage of illumination radiation and detection radiation through, for example, a sample holder or a coverslip of the sample space 2, is optionally arranged in the beam paths between the two objectives 4, 5 and the sample space 2.

The sample space 2 can be displaced in controlled fashion by way of an X-adjustment X in the direction of an X-axis, by way of a Y-adjustment Y in the direction of a Y-axis and by way of a Z-adjustment Z in the direction of a Z-axis. The axes correspond to the X-, Y-, and Z-axes of a Cartesian coordinate system.

A transmitted light source 10, which radiates onto the sample space 2 approximately perpendicularly to the reference plane REF in the switched-on state and using which transmitted light illumination of the sample 3 is made possible, is situated above the sample space 2. To this end, the cover 8 is transparent for the light of the transmitted light source 10. The further light source 11 symbolizes for example ambient light that is likewise incident on the cover 8 and can, at least partially, enter the sample space 2 due to the transparent nature of the cover 8 and cause disturbing signals there. An overview image of the sample 3 can be recorded through the transparent cover 8 using a camera 14. The transmitted light source 10 and the further light source 11 emit radiation of a second wavelength 12. The further light source 11 can also be a lamp or luminaire.

A disadvantage of such an apparatus of the prior art is that light of the further light source 11 can enter the sample space 2 and laser radiation can exit from the sample space 2. In that case, harmful laser light (arrow) can strike for example the eyes E of a user, as is indicated in the illustration.

SUMMARY OF THE INVENTION

The invention is based on the objective of protecting the sample space from undesirable entry and/or exit of radiation of specific wavelengths, but at the same time making desirable illumination and image capturing possible without opening the sample space therefor.

The objective is achieved by an illumination apparatus for a microscope in accordance with Claim 1, a method for operating such an illumination apparatus in accordance with Claim 8, and by a microscope in accordance with Claim 9. Advantageous developments are the subject matter of the dependent claims.

The illumination apparatus for a microscope has a sample space for holding a sample that is to be illuminated and is provided with at least one laser light source and an objective, also referred to as illumination objective, for the directional emission of laser radiation of a first wavelength along a first optical axis that is directed into the sample space; and with a cover of the sample space by which the sample space is delimited at least on one of its sides. The optical axis of the illumination objective is here directed through the sample space onto the cover such that, after its passage through the sample space, the laser radiation of the laser light source is incident on the cover at an illumination angle in an angle range of greater than zero and smaller than 90°. A reference plane extends in a plane defined by a side face of the cover that faces the sample space. The illumination angle is measured, starting from a normal of the reference plane, which is directed into the sample space, between the normal and the first optical axis.

According to the invention, the apparatus has a cover that either: (i) has a layer that is impenetrable for the laser radiation over a blocking angle range of the illumination angle, wherein the angle range of the illumination angle is composed of the blocking angle range and a transmitted light angle range, and the transmitted light angle range is transmissive for radiation of a second wavelength, which differs from the first wavelength, or of a wavelength range of a further light source; or (ii) has a controllable layer that, in a first control state, is transparent for light of the second wavelength and, in a second control state, is impenetrable for the laser radiation of the first wavelength.

The core idea of the invention is a functional cover that makes it possible to reduce the above-explained conflict between darkening, transmitted light illumination/sample observation, laser safety and possibly incubation.

The blocking angle range and the transmitted light angle range preferably add up to 90°. In order to determine the blocking angle range or the transmitted light angle range in a respective configuration according to the invention of the apparatus, preferably a point through which the first optical axis extends is specified. Starting from this point, the transmitted light angle range toward the edge or edges of an opening of the cover can be specified using virtual connecting lines through which the transmitted light angle range is delimited. The opening here serves for the radiation of a transmitted light source entering the sample space. If the cover has no (transmitted light) opening, the cover can have a layer that transmits radiation of a specific wavelength range if said radiation is incident on the layer of the cover at an angle of the transmitted light angle range. Such an angle-dependent or angle-selective layer preferably prevents the laser radiation and radiations of the further light source and/or the transmitted light source from passing through if the latter are incident on the layer at an angle of the blocking angle range. In particular, the blocking angle range comprises large angles of for example at least 45°.

The layer can be a wavelength-dependent, angle-dependent and/or polarization-dependent coating or can comprise the latter. For example, the layer is formed by a transparent carrier made from glass and the coating. Accordingly, the layer is impenetrable for laser radiation of the first wavelength, for laser radiation of the first wavelength that is incident on the layer in a blocking angle range, and/or for laser radiation of the first wavelength having a predetermined polarization.

A wavelength-dependent coating of the cover can be selected such that it suppresses only the wavelengths of the laser radiation used and is transmissive for all other wavelength ranges in particular in the range of visible light (VIS spectrum). In such a case, laser safety is ensured, but not the suppression of ambient light, because a broad spectral distribution of the ambient light must be assumed. Likewise, the coating can be designed to be suppressive over a broad band such that the laser radiation and most of the ambient light (room light) are suppressed. It is furthermore possible that the transmitted light source emits radiation of a second wavelength. This can be accomplished for example if the transmitted light source is a light-emitting diode (LED) or a lamp having an excitation filter and a suitable spectral window of the coating is provided, such that for example only radiation of the second wavelength is transmitted through the layer. Such an embodiment of the illumination apparatus permits the utilization of the transmitted light illumination. The (broadband) ambient light is advantageously reduced to those wavelengths that are transmitted by the spectral window.

If the layer is or comprises an angle-dependent coating of the cover, the coating can be designed such that, at specific angles of the blocking angle range, incident radiation is not transmitted. A not insignificant portion of the ambient light is suppressed while the radiation of the transmitted light source is incident on the layer for example at a small illumination angle, in particular perpendicularly (according to an angle of zero with respect to the normal N) and is transmitted. Both types of coating can also be combined.

The layer of the cover in a further embodiment of the illumination apparatus can consist of a material that is impenetrable for the laser radiation of the first wavelength. The blocking angle range is determined by the extent of the layer parallel to the reference plane and the transmitted light angle range is determined by an opening in the layer. The positional relationship of the opening and the sample space can be invariable, that is to say the cover can be spatially fixed with respect to the sample space. When the sample space is displaced, the cover is likewise correspondingly displaced.

The sample space, or a sample located therein, can in further embodiments of the illumination apparatus be displaceable relative to the cover. The opening can thus be moved over different regions of the sample. Accordingly, these regions can be impinged upon in each case by radiation of the transmitted light source. For the positioning and controlled displacement of the sample, the latter is advantageously located on a controllable sample stage.

The layer can also be a polarization-dependent coating or can comprise the latter. Laser radiation is linearly polarized, and the polarization direction can be set using elements such as half-wave plates. Laser radiation can thus be blocked by a polarization filter, for example a polarization film or coating on the cover, the suppression direction of which is perpendicular to the laser polarization. Unpolarized light can pass through this polarization filter at 50%. Consequently, an overview image can be recorded through the polarization-dependent coating using a camera.

In addition, it is possible to use a transmitted light source whose radiation is either unpolarized or whose polarization direction corresponds to the transmission direction of the polarization filter. The ambient light is reduced thereby by approximately 50%. The polarization-dependent layer of the cover can be embodied as a passive coating. In further embodiments, it can also be designed to be actively switchable. For example, liquid-crystal displays (LC displays) can be used, which utilize polarization properties of specific molecules in an electric field.

The above possibilities for embodying an illumination apparatus according to the invention can also be referred to as passive configuration options, wherein a controllable polarization-dependent coating can already be considered an active embodiment.

Illumination apparatuses having a controllable layer are referred to as active embodiments. The first control state of the controllable layer serves for setting up the sample and obtaining an overview image. The second control state can be used for example for fluorescence imaging. In that case, ambient light is kept away from the detection objective(s), and the laser radiation exiting from the illumination objective or from the illumination objectives is prevented from propagating to outside the sample space. Depending on the intensity of the laser radiation, the control states can be linked by safety circuits. The aim in particular is to ensure that no laser radiation reaches the illumination objective(s) in the first control state. Laser radiation is allowed to enter the sample space only in the second control state. One possibility is to use, what is known, as a shutter by means of which the beam path of the laser radiation upstream of or within the illumination objective can be interrupted.

The controllable layer of the cover can be an electrochromic coating, a liquid-crystal film or a liquid-crystal display. If an electrochromic coating is used, the transmission is set in a controlled fashion as a function of an applied voltage. If a liquid-crystal film is used, such a film is preferably not pixelated and can be embodied for example between glass plates or as a film. Embodiments can be found for example in Baetens et al. (2010) [Baetens, R., Jelle, B. P. & Gustavsen, A. (2010): Properties, requirements and possibilities of smart windows for dynamic daylight and solar energy control in buildings: A state-of-the-art review. Solar Energy Materials and Solar Cells; 94: 87-105].

In one embodiment of the controllable layer in the form of a liquid-crystal display, the latter is advantageously provided with individually addressable and individually controllable elements (pixels). This has the advantage that specific regions of the cover can be switched to be selectively transparent or blocking. For example, it is possible to switch a central region transparent to realize the transmitted light illumination by way of radiation from the transmitted light source. The region that has been switched transparent in terms of its technical effect corresponds to an opening in the cover.

The advantages of active embodiments of the illumination apparatus consist in the feedback-controllable transmission of and shading against both laser radiation and radiation from the transmitted light source and/or of ambient light.

If the illumination apparatus has a cover having a controllable layer, it is possible in a method for operating the illumination apparatus that, during the first control state, the beam path of the laser radiation of the first wavelength is blocked and/or the laser light source is switched off, with the result that the laser radiation does not reach the cover. In this first control state, for example, an overview image of the sample can be captured, the sample space can be opened or the sample can be merely incubated. The controllable layer is substantially or completely transparent for radiation of the second wavelength during the first control state. During the second control state, the beam path of the laser radiation of the first wavelength is unblocked and/or the laser light source is switched on. Consequently, activation, manipulation and/or excitation of the sample is/are possible without exiting laser radiation posing a risk to the environment, because the controllable layer is opaque for laser radiation of the first wavelength. For example, constituent parts of the sample provided with fluorescence markers can be activated and/or excited. Fluorescence markers which have already been excited can also be selectively de-excited or bleached. The controllable layer is preferably opaque for radiation of the second wavelength, particularly preferably for the entire laser radiation and radiation from the VIS spectrum, during the second control state.

Both in passive and in active embodiments of the illumination apparatus, an internal light source may be present in the sample space. This internal light source can also be considered integrated illumination and be used for imaging by way of transmitted light contrast. In one possible embodiment, the internal light source is located on its side face of the cover facing the sample space. The illumination apparatus can be embodied in further embodiments without the transmitted light source but with the internal light source.

The internal light source can be arranged in a spatially fixed manner. If the sample space is displaced relative to at least one of the optical axes of the illumination objective and/or detection objective, the internal light source remains constant relative to the optical axes. In this case, the internal light source can be embodied as a point source or as a surface light source.

If, on the other hand, the internal light source is not spatially fixed, it is moved when the sample space is moved relative to the optical axes illumination objective and/or detection objective. To cancel out the effect of this displacement, the internal light source can have a planar design and consist for example of an array of a number of individual light sources, for example of light-emitting diodes or organic light-emitting diodes (OLEDs). The individual light sources can be controllable individually or in groups, for example in strips or areas. In this way, it is possible by selectively switching the individual light sources to realize different illumination modes such as dark-field illumination, oblique illumination or angle-selective illumination with subsequent combining (see for example DE 10 2014 112 242 A1). In addition, it is possible when coupling the control of the individual light sources to the movement for the individual light sources to be selected such that a constant illumination direction is maintained.

The illumination apparatus according to the invention in each of its possible embodiments can be an essential constituent part of a microscope, in particular of a laser scanning microscope or a light sheet microscope, both in upright and inverted construction.

The microscope can in particular have an inverse arrangement of the illumination objective and detection objective, wherein the optical axis of the illumination objective does not coincide with the normal of the reference plane.

For what is known as live-cell imaging, the sample must additionally be incubated (temperature, gas, air humidity). To this end, the sample space can be embodied in the form of an incubation chamber. Said incubation chamber can be, for example, temperature-controllable and/or allow media such as water, gases, nutrient solutions, staining solutions and/or suspensions to flow through it. For this purpose, the sample space in the form of an incubation chamber can have supply and return lines, connections and/or heating elements and also sensors for monitoring the incubation conditions.

The illumination apparatus according to the invention can of course also be realized without incubation. It is likewise possible for the functionality of the cover to be realized separately from the incubation chamber, which means that an incubation chamber can be employed without changes.

BRIEF DESCRIPTION OF THE DRAWINGS

The invention will be explained in more detail below on the basis of exemplary embodiments and figures. In the figures.

DETAILED DESCRIPTION OF EMBODIMENTS OF THE INVENTION

Figure 1:
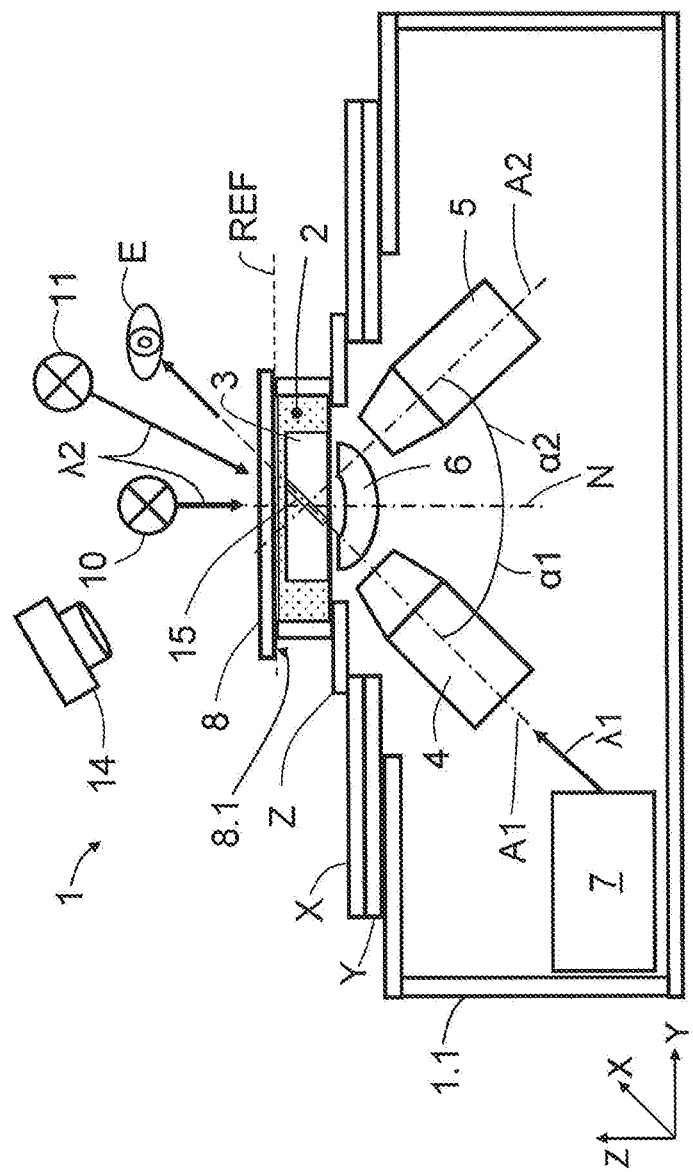
FIG. 1 is a schematic illustration of an illumination apparatus of a microscope according to the prior art.

The prior art as per FIG. 1 and the exemplary embodiments are shown merely schematically and are reduced to the respectively relevant technical elements for clarity reasons. The same reference signs in the figures characterize the same technical elements.

Figure 2:
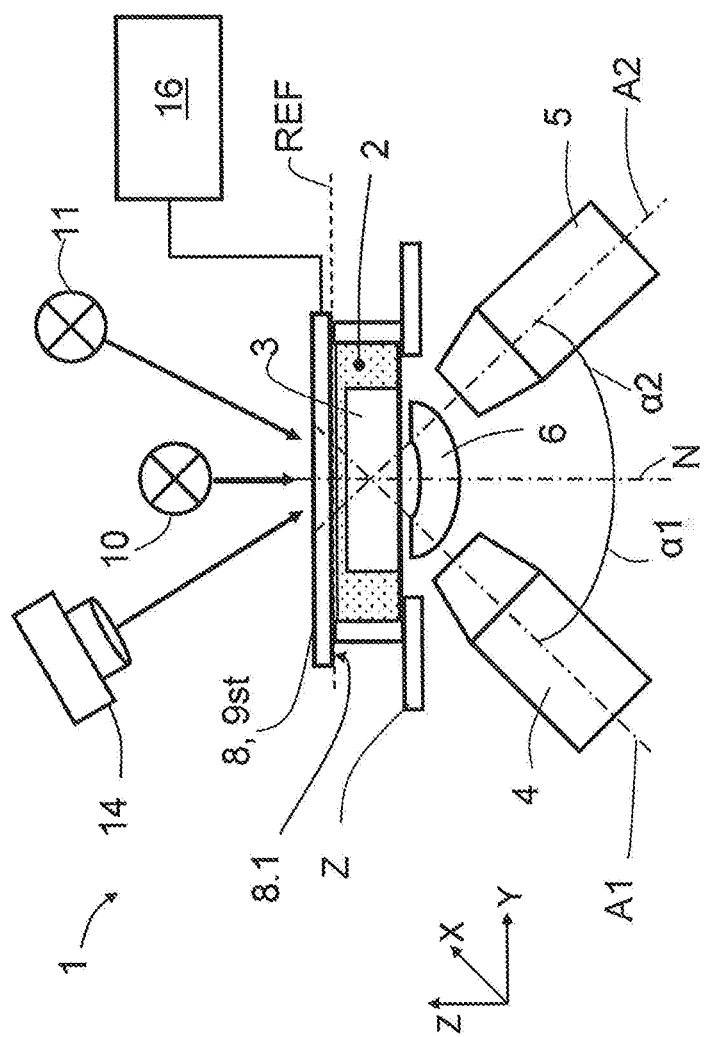
FIG. 2 is a schematic illustration of a first exemplary embodiment of an illumination apparatus according to the invention having a controllable layer in a first control state.

FIG. 2 shows a first exemplary embodiment of an illumination apparatus according to the invention in a microscope 1. The cover 8 has a controllable layer 9*st*, which is electrically controllable using a control unit 16 via electrical connections. The control unit 16 can also be configured to control the laser light source 7 (not shown for clarity reasons), the transmitted light source 10, a further light source 11 in the form of a luminaire, and/or the camera 14 and also the X-adjustment X, the Y-adjustment Y and/or the Z-adjustment Z.

During the illustrated first control state of the controllable layer 9*st*, the latter and consequently the cover 8 are transparent for radiation from the transmitted light source 10. Using the camera 14, an overview image of the sample 3 can be recorded through the transparent controllable layer 9*st*. In addition, light from a further light source 11, which here is representative for ambient light, can enter the sample space 2. In further embodiments of the illumination apparatus, the further light source 11, which can also be an illumination device, can direct radiation of a specific wavelength into the sample space 2. The laser light source 7 is switched off as a result of corresponding control by the control unit 16.

In alternative embodiments, a shutter which interrupts the beam path in the first control state by way of a drive and as a result of a corresponding control command by the control unit 16 can be present in the beam path of the illumination radiation of the illumination objective 4.

Figure 3:
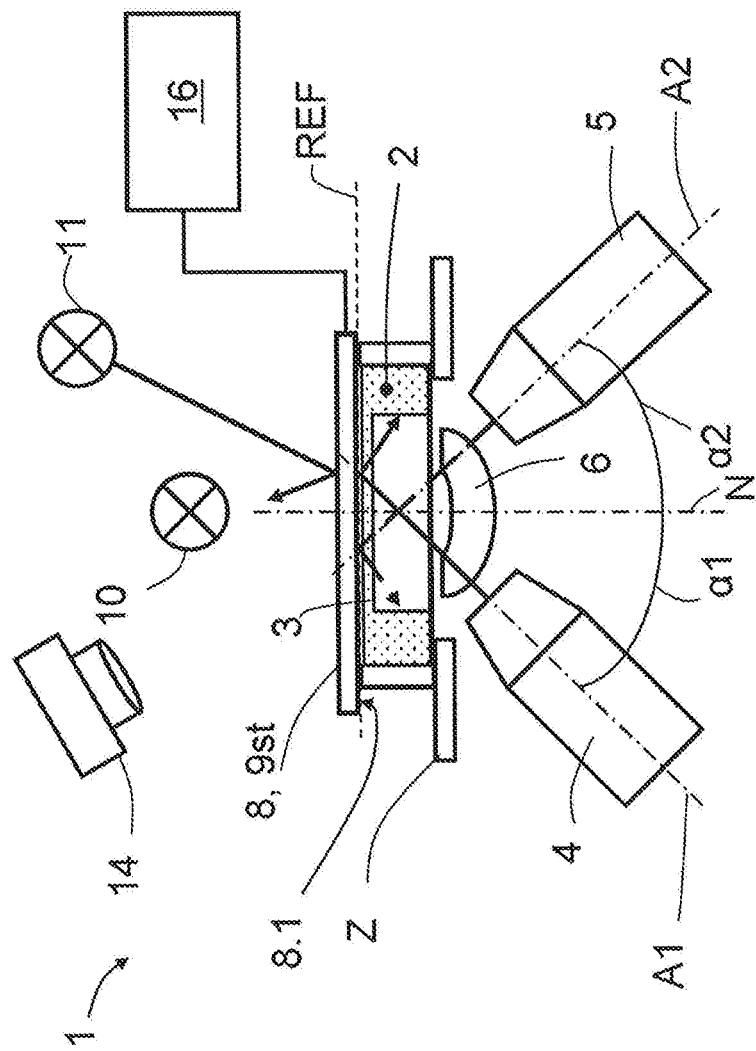
FIG. 3 is a schematic illustration of the first exemplary embodiment of an illumination apparatus according to the invention having a controllable layer in a second control state.

A second control state of the controllable layer 9*st* is illustrated in FIG. 3. The controllable layer 9*st* is opaque for radiation from the transmitted light source 10, the further light source 11 and for laser radiation from the laser light source 7.

The transmitted light source 10 is switched off to save energy. Radiation from the further light source 11, in particular ambient light, does not enter the sample space 2 through the cover 8. The laser radiation (symbolized by a solid thick line) that is directed by way of the illumination objective 4 into the sample space 2 and the sample 3 reaches, after passage through the sample space 2, the cover 8 and is reflected back into the sample space 2 by the controllable layer 9*st* which is in the second control state. Alternatively, the laser radiation can also be reflected into laser traps.

FIG. 3 additionally illustrates that in further embodiments of the illumination apparatus, laser radiation can also, alternatively or additionally, be radiated into the sample space 2 through the objective 5. This second objective 5, which has to this point been referred to as the detection objective, can be used for example in alternation with the first objective 4, referred to as the illumination objective, for illuminating the sample space 2 (symbolized by a dashed thick line). This possibility exists in principle in all embodiments of the illumination apparatus.

Figure 4:
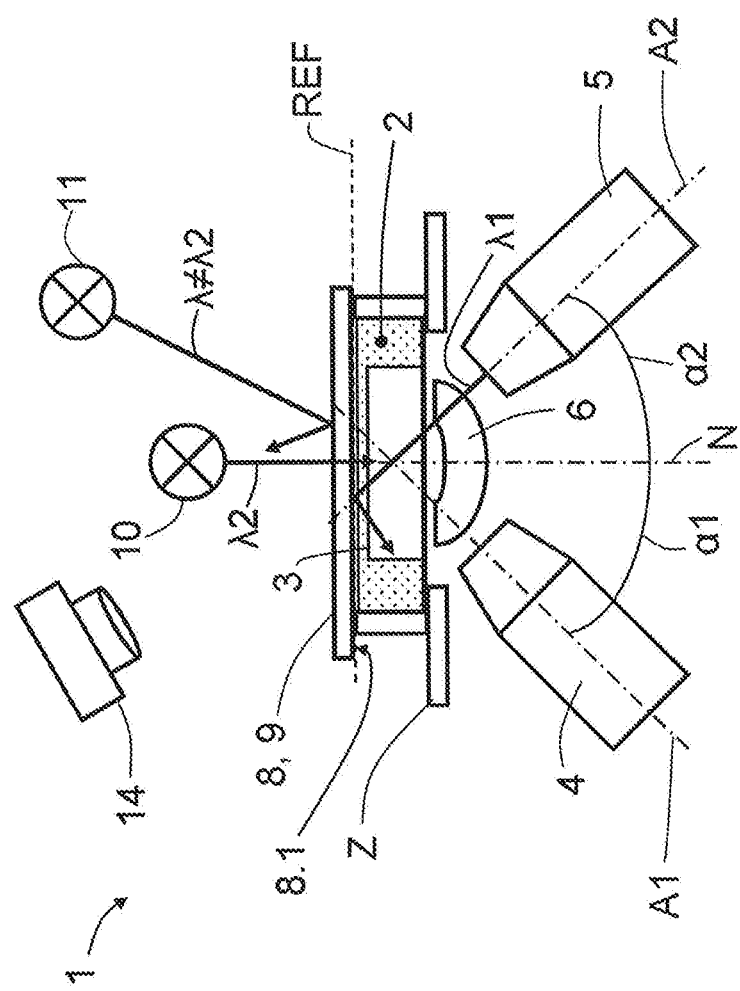
FIG. 4 is a schematic illustration of a second exemplary embodiment of an illumination apparatus according to the invention having a wavelength-dependent layer.

The principle of the wavelength-dependent shielding of laser radiation is shown in FIG. 4. In the exemplary embodiment shown there, the layer 9 is configured as a wavelength-dependent or spectrally selective coating. Radiation of the second wavelength $\lambda 2$ of the transmitted light source 10 can pass through the layer 9 and thus enters the sample space 2 through the cover 8. Laser radiation and ambient light 11 or radiation from the further light source 11 with a wavelength that differs from the second wavelength $\lambda 2$ are reflected at the layer 9.

Figure 5:
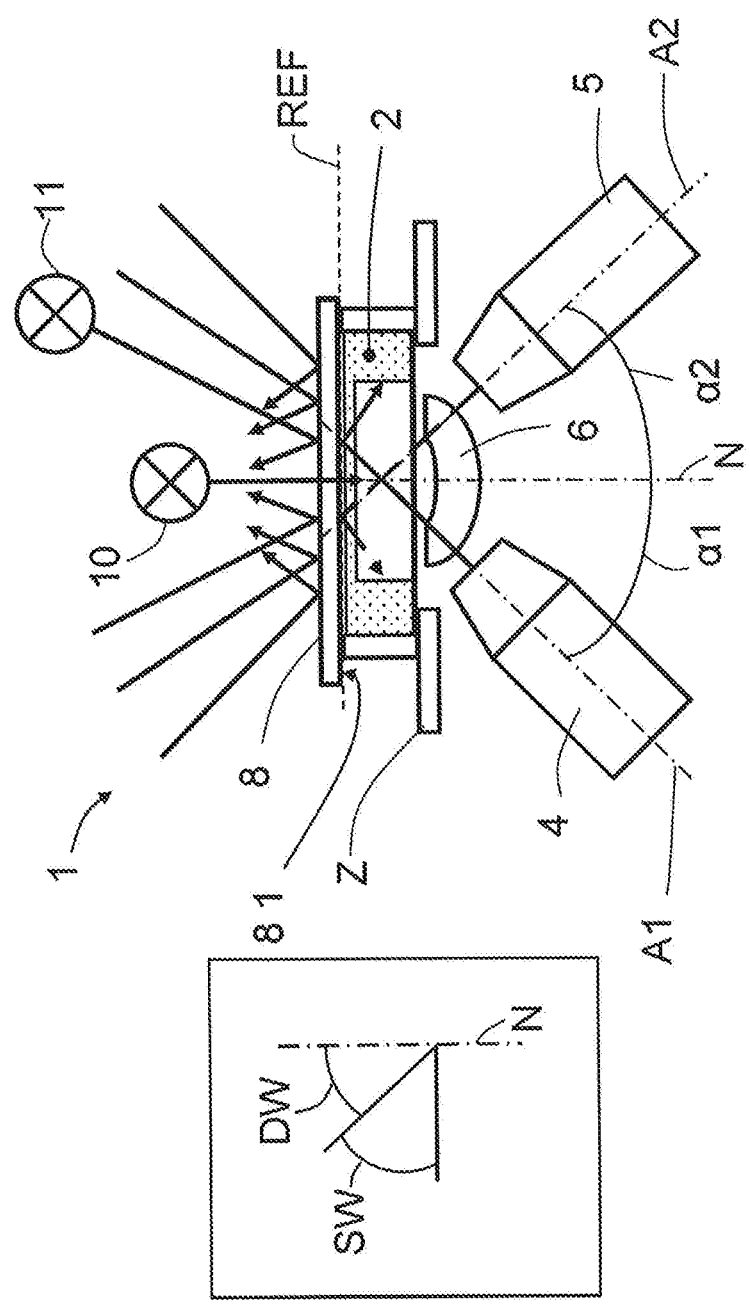
FIG. 5 is a schematic illustration of a third exemplary embodiment of an illumination apparatus according to the invention having an angle-dependent layer.

FIG. 5 illustrates an angle-dependent shield. In the framed inserted figure on FIG. 5, the normal N and, illustrated schematically and by way of example, a transmitted light angle range DW and a blocking angle range SW are shown. If the transmitted light angle range DW and the blocking angle range SW are virtually rotated about the normal N, the three-dimensional manifestation thereof is obtained.

While radiation of the transmitted light source 10 that is incident within the transmitted light angle range DW, for example approximately perpendicularly, on the cover 8 and the layer 9 enters the sample space 2, radiation that is incident on the layer 9 at a flatter angle within the blocking angle range SW is reflected partially or completely.

Figure 6:
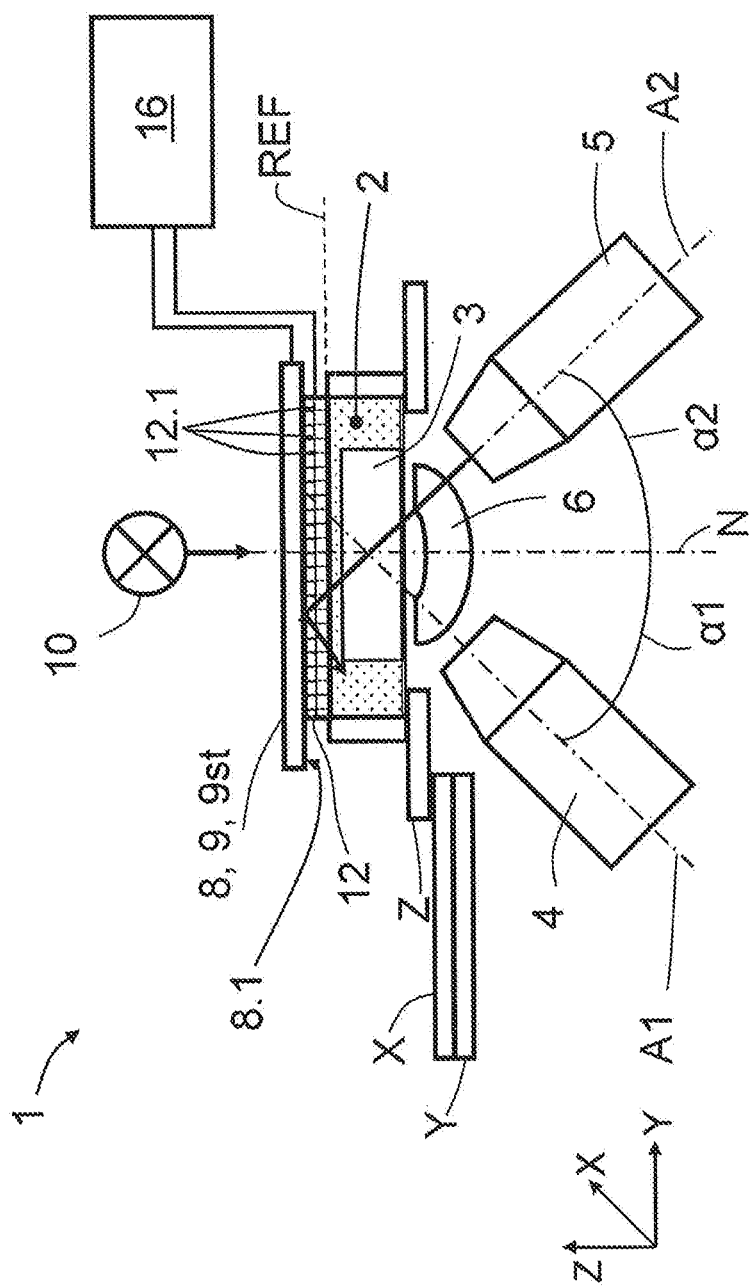
FIG. 6 is a schematic illustration of a fourth exemplary embodiment of an illumination apparatus according to the invention having an internal light source.

FIG. 6 shows a fourth exemplary embodiment of the illumination apparatus according to the invention having an internal light source 12. The cover 8 has a layer 9 or a controllable layer 9*st*. The internal light source 12 that is embodied in the form of an array of individual light sources 12.1 and is controllable individually, in groups and/or overall using the control unit 16 is arranged on a side face 8.1, facing the sample space 2, of the cover 8.

The internal light source 12 can be arranged for example in mutually spaced-apart strips. Radiation of the transmitted light source 10 can enter the sample space 2 between the strips. The internal light source 12 may also have a different form and not cover the entire side face 8.1. Radiation of the transmitted light source 10 can enter the sample space 2 through the non-covered regions. The cover 8 can also comprise an angle-dependent layer 9.

Figure 7:
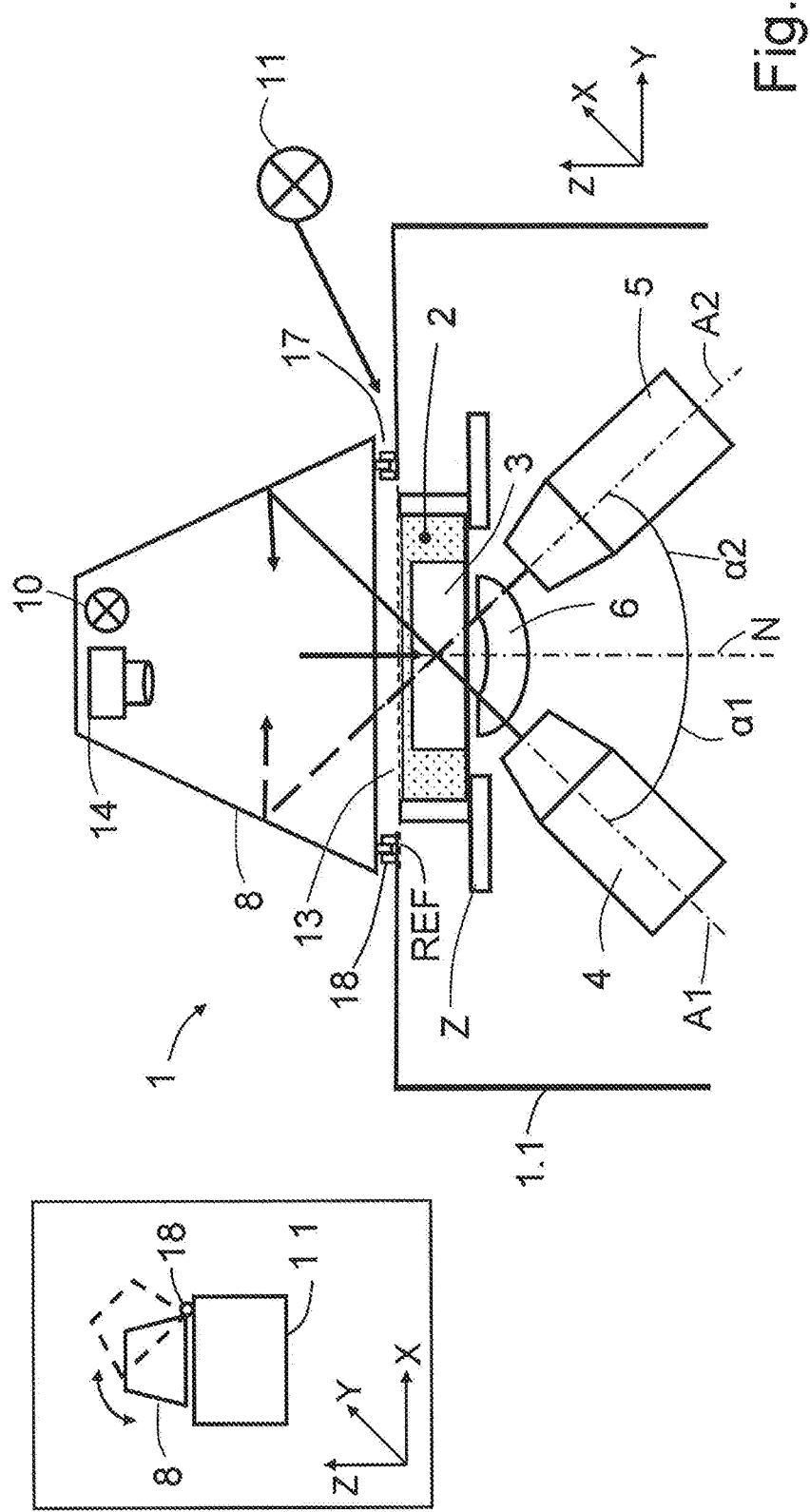
FIG. 7 is a schematic illustration of a fifth exemplary embodiment of an illumination apparatus according to the invention having incubation and an angle-dependent layer.

The fifth exemplary embodiment shown in FIG. 7 shows the cover 8 as a hood above the housing 1.1 of the microscope 1 by which the sample space 2 and the objectives 4, 5 are at least partially surrounded. In addition, the transmitted light source 10 and the camera 14 are enclosed by way of the cover 8 and shielded against the environment. Capturing of an overview image by way of the camera 14 and the illumination by way of the transmitted light source 10 take place through an opening 13 in the housing 1.1.

A gap 17 remains between the cover 8, in the form of the hood, and the housing 1.1. This gap 17 makes it possible that, if the housing 1.1 moves, for example in the Z-direction, the cover 8 does not need to be moved accordingly. The cover 8 is removable or of foldable design, which means that access to the sample space 2 is possible. The inserted figure schematically illustrates the housing 1.1 and the cover 8 in a lateral view. Both are connected to one another by way of an articulation or a hinge 18, permitting opening and closing of the cover 8, as is illustrated in the inserted figure with different opening states in different line types.

The orientations of the optical axes A1, A2 must be effected such that, in the closed state of the cover 8, no laser radiation can pass through the gap 17 into the environment. If the blocking angle range SW is observed, laser radiation is blocked by the cover 8. Only radiation of the further light source 11 that is incident at a very flat angle in the transmitted light angle range DW can pass through the gap 17 under the closed cover 8 and partially into the sample space 2. As a safety measure, a safety switch (not shown) is present, the switching state of which suppresses the emission of laser radiation when the cover 8 is open for example by way of the light source 7 being switched off and/or by a shutter being pivoted into the beam path. In the completely closed state, the switching state of the safety switch permits illumination with laser radiation.

Figure 8:
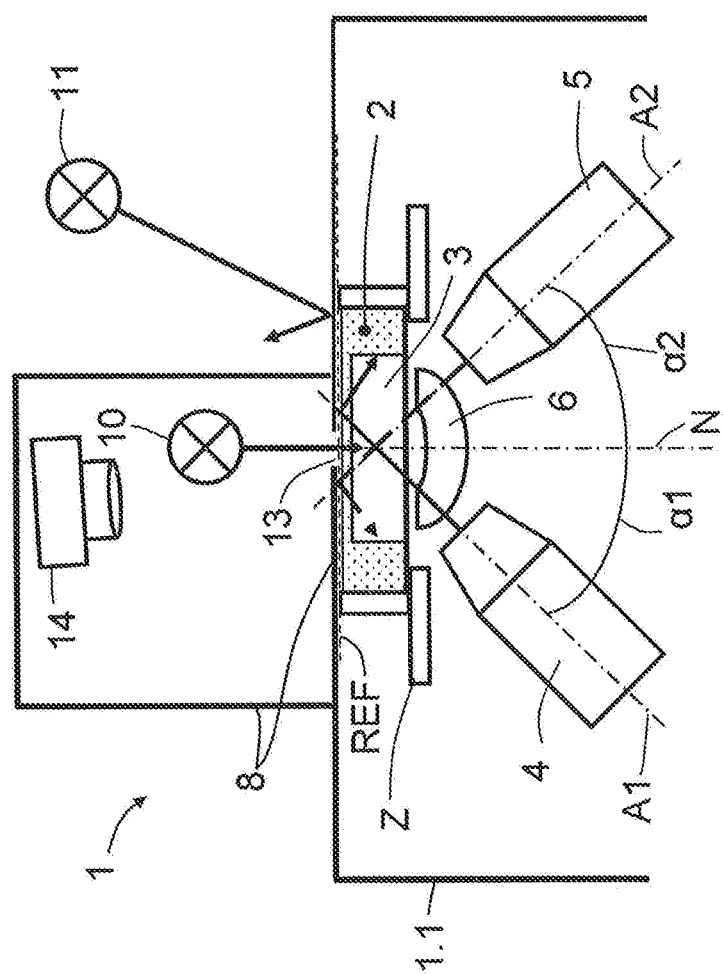
FIG. 8 is a schematic illustration of a sixth exemplary embodiment of an illumination apparatus according to the invention having incubation and an angle-dependent layer.

FIG. 8 shows a modification of the previous exemplary embodiment. The camera 14 and the transmitted light source 10 are enclosed by way of the cover 8. The ambient light 11 cannot enter the sample space 2. Radiation of the transmitted light source 10 can be radiated into the sample space 2 through an opening 13 formed in the cover 8. Capturing of an overview image by way of the camera 14 is likewise performed through the opening 13. To prevent the laser radiation from exiting the sample space 2, the first optical axis A1 and the second optical axis A2 are directed onto the cover 8 next to the opening 13.

Enclosing the sample chamber 2 and further technical elements is advantageous in particular if the sample 3 is to be incubated. The desired conditions such as temperature, illumination and atmosphere can be set and controlled more easily in an enclosed sample chamber 2 than in an open system.

The sample chamber 2 can be displaced along all spatial directions and rotated by way of the controlled X-, Y- and Z-adjustments X, Y, Z. A region of the sample 3 that is to be imaged and/or illuminated with radiation from the transmitted light source 10 can be delivered here in targeted fashion to the opening 13. The cover 8 is spatially fixed. The sample space 2, which fulfills the function of an incubation chamber, is moved under the cover 8.

Figure 9:
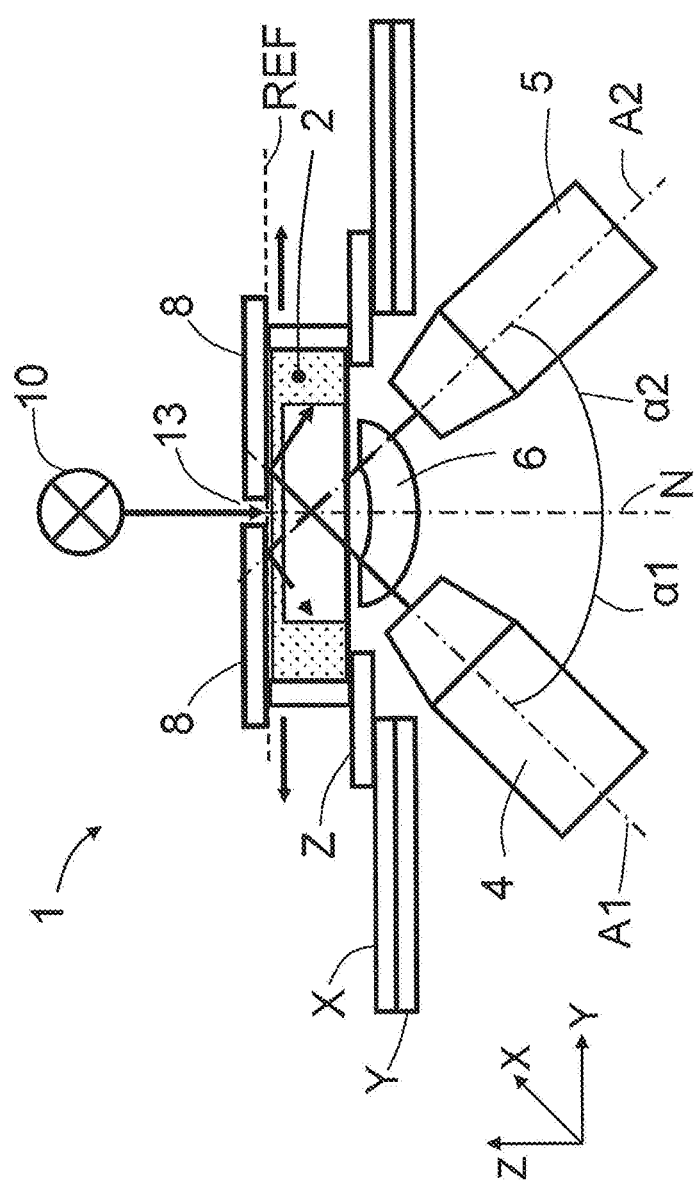
FIG. 9 is a schematic illustration of the sixth exemplary embodiment of the illumination apparatus according to the invention having incubation and a spatially fixed angle-dependent layer.
Figure 11:
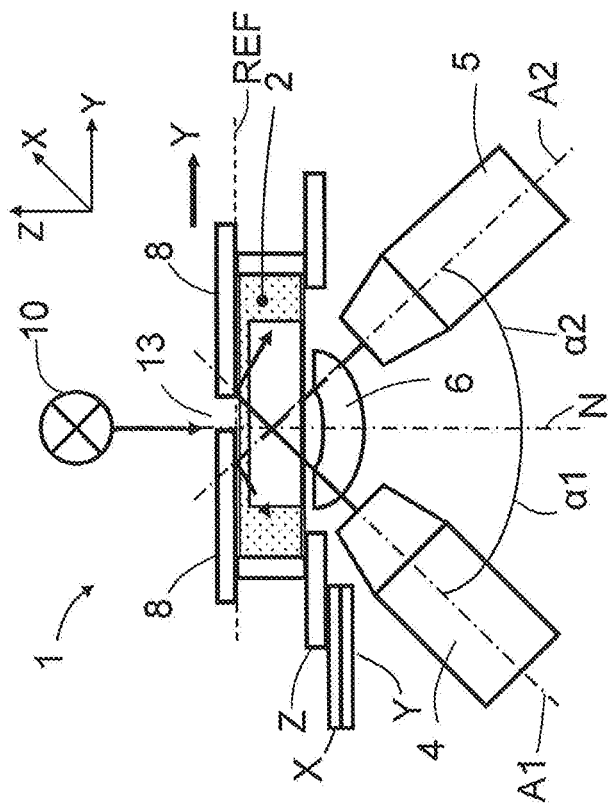
FIG. 11 is a schematic illustration of the sixth exemplary embodiment of the illumination apparatus according to the invention having incubation and a movable angle-dependent layer in a second position.
Figure 10:
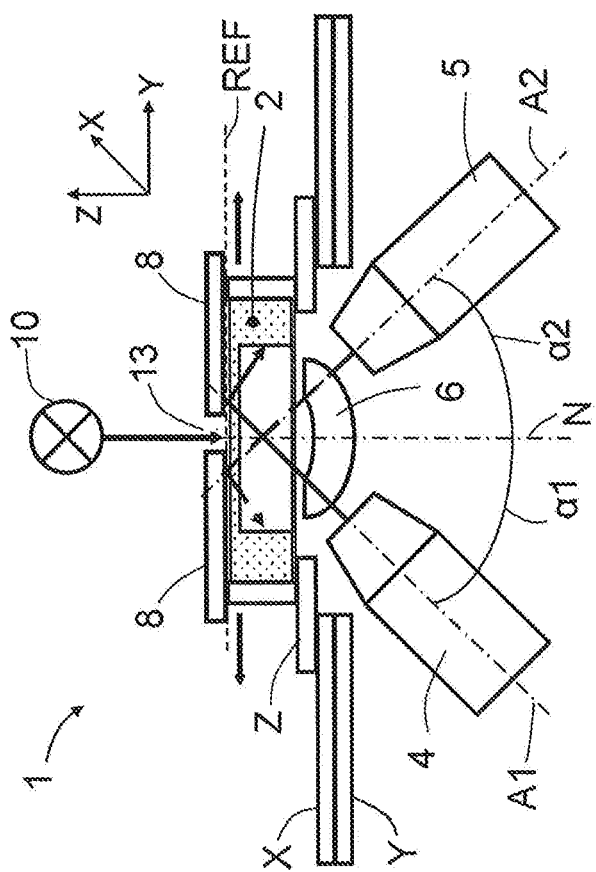
FIG. 10 is a schematic illustration of the sixth exemplary embodiment of the illumination apparatus according to the invention having incubation and a movable angle-dependent layer in a first position.

The delivery of such regions is shown for example in FIGS. 9 to 11 and can be performed with an apparatus both according to the fifth and according to the sixth exemplary embodiment.

FIG. 9 illustrates a spatially fixed arrangement of the cover 8. The sample space 2 is displaced relative to the cover 8 using the X-, Y- and Z-adjustments X, Y, Z.

If the cover 8 in further possible embodiments is moved together with the illumination apparatus, the opening 13 is advantageously selected to be greater than in the embodiment with a spatially fixed cover 8 (FIG. 10). The width of the opening 13 for example in the Y-direction is selected such that, even with maximum travel, that optical axis A1, A2 along which the laser radiation is directed into the sample space 2 continues to be directed at the cover 8 (FIG. 11).

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

REFERENCE SIGNS

1 Microscope
1.1 Housing
2 Sample space
3 Sample
4 First objective
5 Second objective
6 Meniscus lens
7 Laser light source
8 Cover
8.1 Side face
9 Layer
9st Controllable layer
10 Transmitted light source
11 Further light source
12 Internal light source
12.1 Individual light source
13 Opening
14 Camera
15 Light sheet
16 Control unit
17 Gap
18 Articulation, hinge
A1 (First) optical axis (of the illumination objective)
A2 (Second) optical axis (of the detection objective)
DW Transmitted light angle range
E Eye(s)
N Normal
REF Reference plane
SW Blocking angle range
X X-adjustment
Y Y-adjustment
Z Z-adjustment
$\alpha 1$ Illumination angle
$\alpha 2$ Detection angle

What is claimed is:

1. Illumination apparatus for a microscope, comprising:
a sample space for holding a sample that is to be illuminated;

at least one laser light source and an objective for the directional emission of laser radiation of a first wavelength along a first optical axis that is directed into the sample space;

a cover of the sample space by which the sample space is delimited at least on one of its sides;

said optical axis of the objective that serves for emitting the laser radiation is directed through the sample space onto the cover such that the laser radiation of the laser light source, after passage through the sample space, is incident on the cover at an illumination angle in an angle range between zero and less than 90°, wherein a side face, which faces the sample space, of the cover extends in a reference plane and the illumination angle, starting from the reference plane, is measured between the reference plane and a normal of the reference plane that is directed into the sample space;

said cover having a layer that is impenetrable for the laser radiation over a blocking angle range of the illumination angle, wherein the angle range of the illumination angle is composed of the blocking angle range and a transmitted light angle range; and the transmitted light angle range is transmissive for radiation of a second wavelength, which differs from the first wavelength, or of a wavelength range of a further light source, or has a controllable layer that is transparent for radiation of the second wavelength in a first control state; and is impenetrable for the laser radiation of the first wavelength in a second control state.

2. Illumination apparatus according to claim 1, wherein said layer comprises a wavelength-dependent, angle-dependent and/or polarization-dependent coating that is impenetrable for laser radiation of the first wavelength, for laser radiation of the first wavelength that is incident on the layer in a blocking angle range and/or for a laser radiation of the first wavelength that has a predetermined polarization.

3. Illumination apparatus according to claim 1, wherein the controllable layer of the cover is an electrochromic coating, a liquid-crystal film or a liquid-crystal display.

4. Illumination apparatus according to claim 1, wherein the layer consists of a material that is impenetrable for the laser radiation of the first wavelength, the blocking angle range is determined by the extent of the layer parallel to the reference plane, and the transmitted light angle range is determined by an opening in the layer.

5. Illumination apparatus according to claim 1, wherein the cover has an internal light source on its side face that faces the sample space.

6. Illumination apparatus according to claim 1, further comprising an internal light source, which is arranged in a spatially fixed manner relative to the optical axis of the objective that acts as an illumination objective, is provided in the sample space.

7. Illumination apparatus according to claim 5 wherein the internal light source has a number of individual light sources which are controllable individually and/or in groups.

8. A method for operating an illumination apparatus, according to claim 3, comprising a cover having a controllable layer, said controllable layer being impenetrable for laser radiation over blocking angle range of an illumination angle, wherein the angle range of the illumination angle is composed of the blocking angle range and a transmitted light angle range, comprising during a first control state, the beam path of the laser radiation of the first wavelength is blocked and the laser radiation does not reach the cover and/or the laser light source is switched off, and in which, during the second control state, the beam path of the laser radiation of the first wavelength is unblocked and/or the laser light source is switched on.

9. A microscope, comprising an illumination apparatus according to claim 1.

10. The microscope according to claim 9, wherein said objectives are present in an inverse arrangement and the optical axis of the objective, which acts as an illumination objective, does not coincide with the normal of the reference plane.

* * * * *